United States Patent
Yoshida et al.

(10) Patent No.: US 10,429,269 B2
(45) Date of Patent: Oct. 1, 2019

(54) BUILDING SAFETY VERIFICATION SYSTEM AND BUILDING SAFETY VERIFICATION METHOD

(71) Applicant: NTT FACILITIES, INC., Tokyo (JP)

(72) Inventors: Kenichi Yoshida, Tokyo (JP); Shigeto Nagashima, Tokyo (JP); Toshiya Motohi, Tokyo (JP); Kouzou Toyota, Tokyo (JP); Yoshifumi Sugimura, Tokyo (JP); Wataru Gotou, Tokyo (JP); Maki Mochiduki, Tokyo (JP); Hiroyasu Nishii, Tokyo (JP)

(73) Assignee: NTT FACILITIES, INC., Tokyo (JP)

( * ) Notice: Subject to any disclaimer, the term of this patent is extended or adjusted under 35 U.S.C. 154(b) by 826 days.

(21) Appl. No.: 14/759,316

(22) PCT Filed: Jan. 8, 2014

(86) PCT No.: PCT/JP2014/050113
§ 371 (c)(1),
(2) Date: Jul. 6, 2015

(87) PCT Pub. No.: WO2014/109324
PCT Pub. Date: Jul. 17, 2014

(65) Prior Publication Data
US 2015/0355050 A1    Dec. 10, 2015

(30) Foreign Application Priority Data
Jan. 9, 2013 (JP) .................. 2013-002078

(51) Int. Cl.
*G01M 5/00* (2006.01)
*G01B 5/14* (2006.01)
*G01V 1/00* (2006.01)

(52) U.S. Cl.
CPC .............. *G01M 5/0033* (2013.01); *G01B 5/14* (2013.01); *G01M 5/0066* (2013.01); *G01V 1/008* (2013.01); *G01V 2210/1232* (2013.01)

(58) Field of Classification Search
CPC ..................................................... G01M 5/0033
(Continued)

(56) References Cited

U.S. PATENT DOCUMENTS 6,292,108 B1 * 9/2001 Straser ................... G01B 21/32
340/539.1
6,966,154 B1 * 11/2005 Bierwirth ................ E02D 27/34
52/167.4
(Continued)

FOREIGN PATENT DOCUMENTS

CN       1912536 A     2/2007
CN     102297784 A    12/2011
(Continued)

OTHER PUBLICATIONS

Taiwanese Office Action dated Jan. 7, 2015 in Taiwanese Patent Application No. 103100802.
(Continued)

*Primary Examiner* — Moazzam Hossain
(74) *Attorney, Agent, or Firm* — Plumsea Law Group, LLC

(57) ABSTRACT

A building safety verification system and a building safety verification method for estimating a degree of damage of a building after an earthquake occurs are provided. The building safety verification system includes: an inter-story displacement measurement unit which obtains, from measurement data of acceleration sensors which measure accelerations of a plurality of stories in a building, an inter-story displacement of each of the stories; a natural period measurement unit which obtains a natural period of
(Continued)

microtremor of the building from measurement data of a micro vibration sensor which measures micro vibration of a highest story of the building or a story near the highest story; and a building safety evaluation unit which evaluates soundness of the building from the inter-story displacement obtained by the inter-story displacement measurement unit and the natural period obtained by the natural period measurement unit.

22 Claims, 8 Drawing Sheets

(58) Field of Classification Search
USPC .......................................................... 702/56
See application file for complete search history.

(56) References Cited

U.S. PATENT DOCUMENTS

| | | | | |
|---|---|---|---|---|
| 2004/0153270 | A1* | 8/2004 | Yamashita | G01N 33/383 702/81 |
| 2005/0165588 | A1* | 7/2005 | Iwan | G01M 7/00 703/2 |
| 2009/0114484 | A1* | 5/2009 | Watanabe | B66B 5/022 187/278 |
| 2009/0222210 | A1 | 9/2009 | Meskouris et al. | |
| 2010/0271199 | A1 | 10/2010 | Belov et al. | |
| 2014/0035726 | A1* | 2/2014 | Schoner | G06K 7/10366 340/8.1 |
| 2014/0324356 | A1* | 10/2014 | Park | G01M 7/00 702/15 |
| 2016/0084961 | A1* | 3/2016 | Morishita | G01S 19/14 342/357.52 |

FOREIGN PATENT DOCUMENTS

| | | |
|---|---|---|
| CN | 202631276 U | 12/2012 |
| JP | 2003322585 A | 11/2003 |
| JP | 2003344213 A | 12/2003 |
| JP | 2004093579 A | 3/2004 |
| JP | 2004251678 A | 9/2004 |
| JP | 2005121464 A | 5/2005 |
| JP | 2006329878 A | 12/2006 |
| JP | 2008008810 A | 1/2008 |
| JP | 2008039507 A | 2/2008 |
| JP | 2008090534 A | 4/2008 |
| JP | 2008090534 A * | 4/2008 |
| JP | 2008224338 A | 9/2008 |
| JP | 2008281435 A | 11/2008 |
| JP | 2009120337 A | 6/2009 |
| JP | 2009217399 A | 9/2009 |
| JP | 2010139271 A | 6/2010 |
| JP | 2010276518 A | 12/2010 |
| JP | 2011074714 A | 4/2011 |
| JP | 2011149249 A | 8/2011 |
| JP | 2012018045 A | 1/2012 |
| JP | 2012018069 A | 1/2012 |
| JP | 2013170955 A * | 9/2013 |
| JP | 2016075583 A * | 5/2016 |
| TW | 464717 B | 11/2001 |

OTHER PUBLICATIONS

Japanese Office Action dated Mar. 17, 2015 in Japanese Patent Application No. 2013-002078.
Japanese Office Action dated Mar. 17, 2015 in Japanese Patent Application No. 2015-010366.
Shoko Tanaka et al. , "Evaluation of the Structural Deterioration of a Building for the Development of a Real Time Seismic Health Monitoring System", 2007 Nendo Taikai (Kyushu) Gakujutsu Koen Kogaishu, separate vol. B-2, Jul. 31, 2007 (Jul. 31, 2007), pp. 41, 42.
International Search Report dated Apr. 22, 2014 in PCT Application No. PCT/JP2014/050113.
"Guidelines for Using Structural Health Monitoring Technology Supporting Maintenance, Management, and Distribution of Houses Used by Multiple Generations(draft)", Dec. 2011, National Institute for Land and Infrastructure Management (Project on total development of technologies for houses used by multiple generations, management technologies WG), Posted on the HP National Institute for Land and Infrastructure Management (Distribution was started on Aug. 15, 2012).
Measurement and Control, vol. 46, No. 8, Aug. 2007, p. 632-636.
Concerning a guideline for creating fire protection plan in response to large-scaled earthquakes, etc., Fire Protection Division No. 272, Oct. 21, 2008.
Yuta Kamoi, Saburo Midorikawa: Study related to recognition of evacuation stated in high-story buildings at the time of earthquakes based on simple simulation, Summaries of technical papers of annual meeting of Architectural Institute of Japan B2, pp. 643-644 (Jul. 31, 2005).
Japanese Office Action—Opposition with English Translation dated Jun. 8, 2016 in Application No. 2013-002078.
Japanese Office Action—Opposition with English Translation dated Jun. 8, 2016 in Application No. 2015-010366.
"Development of Building Monitoring System to Evaluate Residual Seismic Capacity after an Earthquake" by K. Kusunoki & A. Tasai and M. Teshigawara for 15th World Conference on Earthquake Engineering in Lisbon, Portugal; Sep. 24 to Sep. 28, 2012.
Office Action dated Jan. 26, 2017 for Chilean Patent Application No. 1911-2015.
"Development of Real-Time Residual Seismic Capacity Evaluation System-Integral Method and Shaking Table Test With Plain Steel Frame" by K. Kusunoki & A. Tasai and M. Teshigawara for 13th World Conference on Earthquake Engineering in Vancouver, B.C., Canada; Aug. 1-6, 2004. Paper No. 609.
Office Action dated Feb. 3, 2017 for Chinese Patent Application No. 201480003814.9.
Japanese Office Action Notice of Reason for Rescission dated Aug. 10, 2016 in Japanese Patent Application No. 2015-010366 (child of Japanese Patent Application No. 2013-002078).

* cited by examiner

FIG. 3

| PARAMETER PATTERN | ESTIMATED SITUATION | DETERMINATION |
|---|---|---|
| A. DESIGNED INTER-STORY DEFORMATION ANGLE < Δ NATURAL PERIOD BECOMES LONG AND RIGIDITY OBVIOUSLY DECREASES | STRUCTURAL SKELETON DAMAGE IS GREATER THAN OR EQUAL TO ASSUMED VALUE MAGNITUDE OF DAMAGE IS GREATER THAN OR EQUAL TO ASSUMED VALUE | RAPID EXAMINATION IS NECESSARY |
| B. DESIGNED INTER-STORY DEFORMATION ANGLE < Δ NATURAL PERIOD DOES NOT CHANGE | STRUCTURAL SKELETON DAMAGE IS LESS THAN OR EQUAL TO ASSUMED VALUE | CONTINUOUS USE IS POSSIBLE, BUT IT SHOULD BE USED WITH CAUTION |
| C. DESIGNED INTER-STORY DEFORMATION ANGLE ≧ Δ NATURAL PERIOD BECOMES LONG AND RIGIDITY OBVIOUSLY DECREASES | STRUCTURAL SKELETON DAMAGE IS LESS THAN OR EQUAL TO ASSUMED VALUE | CONTINUOUS USE IS POSSIBLE, BUT IT SHOULD BE USED WITH CAUTION |
| D. DESIGNED INTER-STORY DEFORMATION ANGLE ≧ Δ NATURAL PERIOD DOES NOT CHANGE | STRUCTURAL SKELETON DAMAGE IS LESS THAN OR EQUAL TO ASSUMED VALUE | CONTINUOUS USE IS POSSIBLE |

FIG. 4

| FLOOR NUMBER | DETERMINATION RESULT | COUNTERMEASURE |
|---|---|---|
| $100_1$ | CONTINUOUS USE IS POSSIBLE (D) | WAIT UNTIL INSTRUCTION IS RECEIVED |
| $100_2$ | CONTINUOUS USE IS POSSIBLE, BUT IT SHOULD BE USED WITH CAUTION (B) | WAIT UNTIL INSTRUCTION IS RECEIVED |
| $100_3$ | RAPID EXAMINATION IS NECESSARY (A) | EMERGENCY EVACUATION |
| $100_4$ | CONTINUOUS USE IS POSSIBLE, BUT IT SHOULD BE USED WITH CAUTION (B) | EMERGENCY EVACUATION |
| ⋮ | ⋮ | ⋮ |

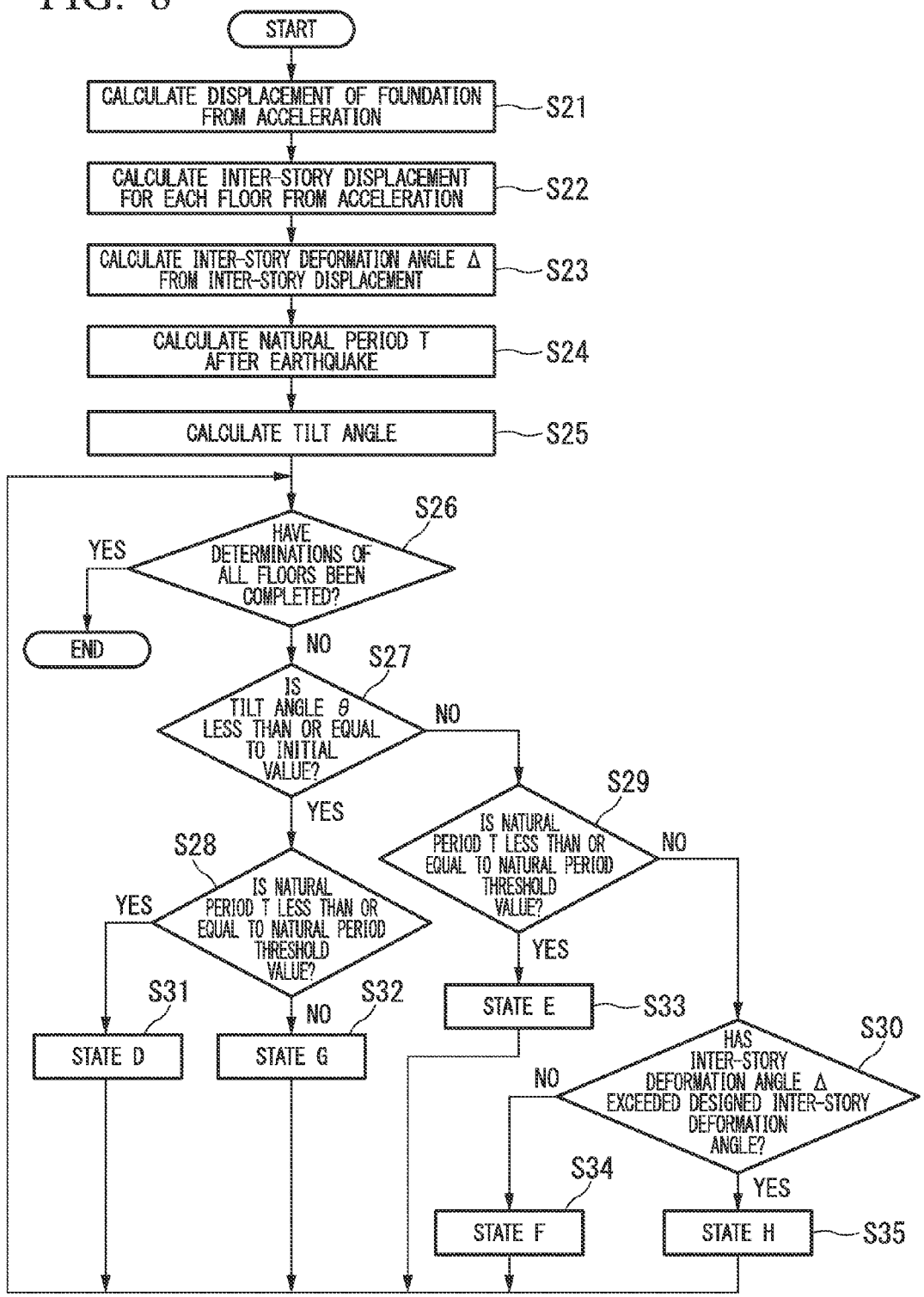

BUILDING SAFETY VERIFICATION SYSTEM AND BUILDING SAFETY VERIFICATION METHOD

CROSS-REFERENCE TO RELATED APPLICATION(S)

Priority is claimed on Japanese Patent Application No. 2013-002078 filed Jan. 9, 2013, the content of which is incorporated herein by reference. This application is the U.S. National Phase application of the counterpart PCT application number PCT/JP2014/050113 having a PCT filing date of Jan. 8, 2014, the disclosure of which is incorporated herein by reference.

TECHNICAL FIELD

The present invention relates to a building safety verification system and a building safety verification method for estimating an influence of an earthquake on a building.

BACKGROUND ART

In recent years, the interest in performance of buildings (structures) in terms of earthquake resistance has increased. Thus, the soundness of a building at the time of an earthquake may be monitored by providing measurement means that measures information related to the deformation of a structure such as an accelerometer, a strain gauge, or a displacement gauge.

Then, data measured by these measurement means is sent to a data monitoring room or the like away from a site and the data is collected through a data analysis computer or the like. The data analysis computer calculates inter-story deformation of the building and compares the calculated inter-story deformation with a setting value to determine whether there is damage to the building, and a determination result is used, for example, to evaluate soundness and check safety after an earthquake occurs (for example, see Patent Document 1).

In addition, a method for determining damage to a building caused by an external force such as an earthquake or a strong wind or aging deterioration of structural materials based on measurement of a microtremor is also used (for example, see Patent Document 2). Here, in Patent Document 2, a damaged portion of a building is determined based on a relationship between a natural frequency and a natural mode because the order of the vibration property in which the value of a natural frequency is reduced becomes apparent by comparing a natural frequency under sound conditions with a natural frequency at the time of evaluation for every order of the vibration property.

PRIOR ART DOCUMENTS

Patent Documents

Patent Document 1: Japanese Unexamined Patent Application, First Publication No. 2008-281435
Patent Document 2: Japanese Unexamined Patent Application, First Publication No. 2010-276518

SUMMARY OF THE INVENTION

Problems to be Solved by the Invention

However, in the aforementioned Patent Document 1, it is not known whether a completed building has actually been constructed with the strength it was designed to have. That is, even when a design criterion value that has been set during design, for example, the strength of a concrete beam placed during construction, is one in which the beam is damaged at an inter-story deformation of $1/100$, a constructed building may actually have a strength at which damage occurs at an inter-story deformation of $2/100$. In this case, even when an inter-story deformation of $1/100$ is generated by an earthquake, it is not exactly known whether the concrete beam is damaged and there is a chance of the beam not being damaged.

In addition, in Patent Document 2, a natural frequency of a building under sound conditions is compared with a natural frequency at the time of evaluation for every order of the vibration property, and the occurrence of damage is determined from the vibration characteristic in which the value of the natural frequency is reduced. However, the natural frequency varies not only with the damage to a structural skeleton supporting the building, but also with the damage to non-structural members such as non-structural walls or ceilings that are not part of the structural skeleton. Thus, it is difficult to determine a damaged portion among the structural skeleton and non-structural members (non-structural walls, ceilings, or the like) and the degree of damage, and it is difficult to determine the continuous use of the building.

The present invention has been made in view of the aforementioned circumstances and an object thereof is to provide a building safety verification system and a building safety verification method for estimating a degree of damage to a building after an earthquake occurs.

Means for Solving the Problems

According to the present invention, a building safety verification system includes: an inter-story displacement measurement unit which obtains, from measurement data of acceleration sensors which measure accelerations of a plurality of stories in a building, an inter-story displacement of each of the stories; a natural period measurement unit which obtains a natural period of microtremor of the building from measurement data of a micro vibration sensor which measures micro vibration of a highest story of the building or a story near the highest story; and a building safety evaluation unit which evaluates soundness of the building from the inter-story displacement obtained by the inter-story displacement measurement unit and the natural period obtained by the natural period measurement unit.

Preferably, in the building safety verification system of the present invention, the building safety evaluation unit evaluates the soundness of the building from a combination of a first determination result of determining whether the inter-story displacement exceeds a preset inter-story displacement threshold value and a second determination result of determining whether the natural period exceeds a preset natural period threshold value.

Preferably, the building safety verification system of the present invention further includes: a tilt angle measurement unit which is disposed in the highest story of the building or the story near the highest story and measures a tilt angle of the building, wherein the building safety evaluation unit evaluates the soundness of the building from the inter-story displacement, the natural period, and the tilt angle.

Preferably, in the building safety verification system, the building safety evaluation unit evaluates the soundness of the building from a combination of a first determination result of determining whether the inter-story displacement exceeds a preset inter-story displacement threshold value, a second determination result of determining whether the natural period exceeds a preset natural period threshold value, and a third determination result of determining whether the tilt angle exceeds a preset tilt angle threshold value.

A building safety verify+cation method of the present invention includes: an inter-story displacement measurement step of obtaining, by an inter-story displacement measurement unit, from measurement data of acceleration sensors which measure accelerations of a plurality of stories in a building, an inter-story displacement of each of the stories; a natural period measurement step of obtaining, by a natural period measurement unit, a natural period of microtremor of the building from measurement data of a micro vibration sensor which measures micro vibration of a highest story of the building or a story near the highest story; and a building safety evaluation step of evaluating, by a building safety evaluation unit, soundness of the building from the inter-story displacement obtained by the inter-story displacement measurement unit and the natural period obtained by the natural period measurement unit.

Advantageous Effects of the Invention

As described above, it is possible for the present invention to provide a building safety verification system and a building safety verification method that estimate a degree of damage of a building after an earthquake occurs.

BRIEF DESCRIPTION OF THE DRAWINGS

FIG. 3 is a diagram illustrating a configuration of a determination table stored in a database 14 of FIG. 1.

FIG. 4 is a diagram illustrating an example of a configuration of a determination result table stored in the database 14.

FIG. 8 is a flowchart illustrating a flow of a process in which the building safety verification system 2 in accordance with the second embodiment verifies the safety of the building.

DETAILED DESCRIPTION

In a building safety verification system of the present invention, an acceleration sensor is provided in each of all stories (floors, layers) or some stories of a building (structure) including a plurality of stories, an inter-story displacement measurement unit which obtains an inter-story displacement of a story in which the acceleration sensor is provided from measurement data measured by the acceleration sensor is installed, the inter-story displacement of each story of the building is measured by the inter-story displacement measurement unit, a natural period measurement unit is provided in the highest story of the building or a story near the highest story, and a natural period of the building is measured from a microtremor of the building by the natural period measurement unit. In addition, in the building safety verification system of the present invention, the building safety evaluation unit evaluates soundness of the building through an inter-story displacement measured by the inter-story displacement measurement unit and a natural period measured by the natural period measurement unit. Thereby, it is possible for the building earthquake-resistance evaluation system of the present invention to make a composite determination corresponding to, for example, whether continuous use of the building is possible through an inter-story displacement of the building in an earthquake when the earthquake has occurred and a difference between natural periods before and after the earthquake.

First Embodiment

Figure 1:
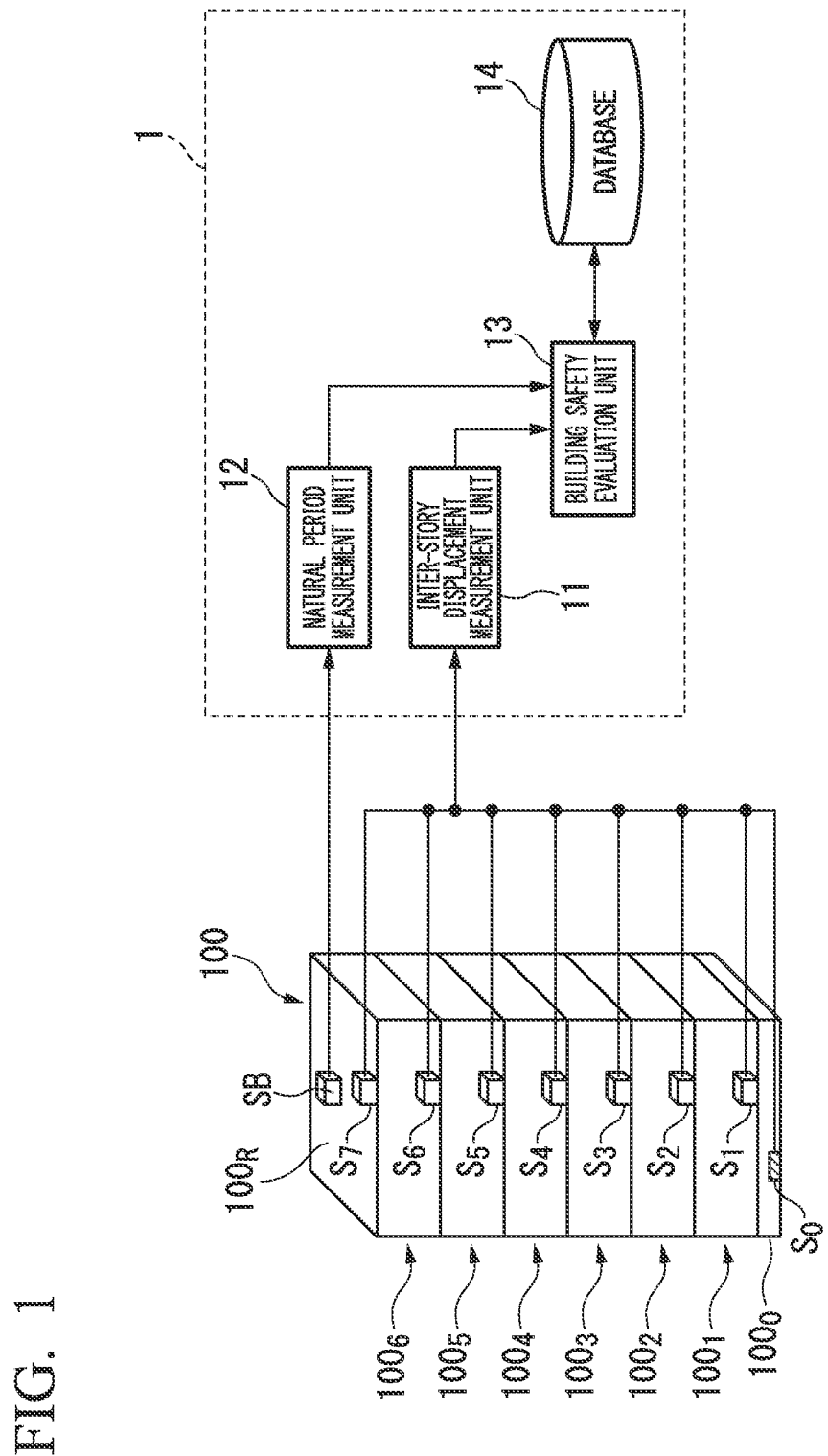
FIG. 1 is a conceptual diagram illustrating an example of a configuration in which a building safety verification system in accordance with a first embodiment of the present invention is connected to acceleration sensors and a micro vibration sensor provided in a building serving as an evaluation target.

Hereinafter, a building safety verification system in accordance with the first embodiment of the present invention will be described using the drawings. FIG. 1 is a conceptual diagram illustrating an example of a configuration in which the building safety verification system in accordance with the first embodiment of the present invention is connected to acceleration sensors and a micro vibration sensor provided in a building serving as an evaluation target.

In FIG. 1, acceleration data is supplied as vibration data of an earthquake from each of acceleration sensors $S_0$ to $S_n$ (0 denotes a foundation and 1 to n denote floor numbers of the building) provided in a building 100 to a building safety verification system 1 through an information communication network including the Internet and the like. The acceleration sensor $S_0$ is provided to measure acceleration in a foundation portion of the building, measures earth motion acceleration applied to a lowest story portion (for example, a foundation provided on the ground below a first floor $100_1$ when there is no underground portion) of the building serving as an earthquake-resistance evaluation target, and outputs it as acceleration data to the building safety verification system 1 via the information communication network.

In addition, each of the acceleration sensors $S_1$ to $S_n$ measures an acceleration value applied to each acceleration sensor in first to $n^{th}$ floors and transmits it as the acceleration data to the building safety verification system 1 via the information communication network. Here, as illustrated in FIG. 1, the acceleration sensor is disposed in each floor of the building. When the building 100 of FIG. 1 is a six-floor building, the acceleration sensor $S_1$ is disposed in a first floor $100_1$, the acceleration sensor $S_2$ is disposed in a second floor $100_2$, the acceleration sensor $S_3$ is disposed in a third floor $100_3$, the acceleration sensor $S_4$ is disposed in a fourth floor $100_4$, the acceleration sensor $S_5$ is disposed in a fifth floor $100_5$, the acceleration sensor $S_6$ is disposed in a sixth floor $100_6$, and the acceleration sensor $S_7$ is disposed in a rooftop $100_R$. In addition, the acceleration sensor $S_0$ is disposed in a foundation portion $100_0$ of the building 100. Moreover, a micro vibration sensor SB is disposed in the rooftop $100_R$ of the building 100. Furthermore, the micro vibration sensor SB may be disposed in the highest floor near the rooftop $100_R$ instead of the rooftop $100_R$.

The building safety verification system 1 includes an inter-story displacement measurement unit 11, a natural period measurement unit 12, a building safety evaluation unit 13, and a database 14.

The inter-story displacement measurement unit 11, for example, obtains displacements of the foundation $100_0$ and the first floor $100_1$ to the $n^{th}$ floor $100_n$ in an acceleration direction by integrating acceleration data supplied from each of the acceleration sensors $S_0$ to $S_6$ twice, calculates a difference between displacements of adjacent floors, and obtains an inter-story displacement $\delta$ in each floor of the building 100. At this time, the inter-story displacement measurement unit 11 extracts maximum acceleration for every floor from acceleration data in the earthquake supplied from each acceleration sensor, obtains a distance by integrating the maximum acceleration twice, and sets the distance as a displacement of each floor. In addition, the inter-story displacement measurement unit 11 divides each of obtained inter-story displacements $\delta$ of the floors by a height of each floor and calculates an inter-story deformation angle $\Delta$ (radians) of each floor. It is to be noted that methods other than that disclosed in the present embodiment may be used as a method for obtaining a displacement from acceleration data. In particular, a method for obtaining an inter-story displacement or an inter-story deformation angle by constructing a vibration analysis model of a target building and fitting various factors of the vibration analysis model to a real building using a measured natural frequency and measured acceleration of each floor may also be used.

The natural period measurement unit 12 performs frequency analysis of micro vibration data supplied from the micro vibration sensor SB. Then, the natural period measurement unit 12 selects a frequency having a peak (highest power spectrum value) in a power spectrum as a natural frequency and outputs a period corresponding to this natural frequency as a natural period.

Figure 2:
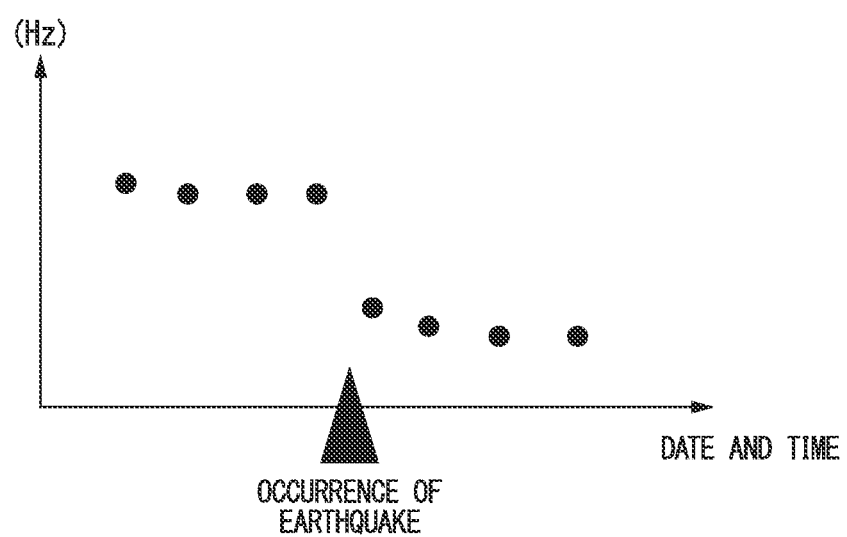
FIG. 2 is a diagram illustrating a change in a natural frequency of a building.

FIG. 2 is a diagram illustrating a change in a natural frequency of a building. In FIG. 2, the vertical axis represents a natural frequency and the horizontal axis represents time. The natural period corresponds to a rigidity of the building, it becomes long when the rigidity is low, and it becomes short when the rigidity is high. That is, as illustrated in FIG. 2, when stress is given through strong vibration of the earthquake, a member of a structural skeleton of the building (a main structure, a frame, or the like of the building) or a member not belonging to the structural skeleton (a non-structural wall, a ceiling, or the like) is damaged, the rigidity of the building decreases, and the natural frequency decreases. In the present embodiment, an inter-story deformation angle $\Delta$ and a natural period T are represented as absolute values.

In addition, a configuration in which another micro vibration sensor is provided in a lowest story of the building in addition to the above-described micro vibration sensor SB and the natural period measurement unit 12 eliminates a noise component superposed on micro vibration data output by the micro vibration sensor SB based on micro vibration data of the other micro vibration sensor and obtains a more accurate natural frequency may be provided.

Further, a configuration in which the micro vibration sensor is provided in each floor and the natural frequency is obtained for each floor may be provided.

The building safety evaluation unit 13 determines a degree of damage of the structural skeleton through the inter-story deformation angle $\Delta$ obtained by the inter-story displacement measurement unit 11 and the natural period of the building obtained by the natural period measurement unit 12. That is, the building safety evaluation unit 13 compares the inter-story deformation angle $\Delta$ with a preset designed inter-story deformation angle (inter-story displacement threshold value), and determines whether the inter-story deformation angle $\Delta$ exceeds the designed inter-story deformation angle. At this time, the building safety evaluation unit 13 compares the natural period T with an initial value of the natural period (for example, a natural period immediately after construction of the building or a natural period immediately before an earthquake occurs), and determines whether the natural period T is less than or equal to the initial value of the natural period.

A natural period threshold value may be generated by adding a margin of a change with time to the initial value of the natural period, instead of the initial value of the natural period, and the natural period threshold value may be compared with the natural period T. Here, the initial value of the natural period<the natural period threshold value is satisfied. The initial value of the natural period or the natural period threshold value and the designed inter-story deformation angle are stored in a storage unit within the building safety evaluation unit 13 in advance, and the building safety evaluation unit 13 reads and uses the initial value of the natural period or the natural period threshold value and the designed inter-story deformation angle from the storage unit within the building safety evaluation unit 13 itself when the determination is made.

FIG. 3 is a diagram illustrating a configuration of a determination table stored in the database 14 of FIG. 1. This determination table shows a determination result of the soundness of the building based on a combination of a result of comparing the inter-story deformation angle $\Delta$ with the designed inter-story deformation angle and a result of comparing the natural period T with the initial value of the natural period. The designed inter-story deformation angle is set to a value at which a member of a structural skeleton has damage such as deformation (a value indicating a limit of plastic deformation having a state in which the member of the structural skeleton does not return to the original from a state in which the member of the structural skeleton has been deformed including breakage or the like) when an inter-story displacement exceeding the value of the designed inter-story deformation angle has occurred. Hereinafter, a determination of the safety (soundness) of the building corresponding to a parameter pattern indicating a pattern of a determination using the natural period T and the inter-story deformation angle $\Delta$ is shown.

Parameter Pattern A

When it is determined that the inter-story deformation angle $\Delta$ exceeds the designed inter-story deformation angle and the rigidity decreases because the natural period is longer than the natural period threshold value, a degree of damage of the building is estimated as follows. A situation of the building is estimated that the damage to the structural skeleton is greater than or equal to an assumed value and the magnitude of the damage to the building is greater than or equal to an assumed value. Thereby, the determination result represents that "rapid examination of the damage to the building is necessary".

Parameter Pattern B

When it is determined that the inter-story deformation angle $\Delta$ exceeds the designed inter-story deformation angle but the rigidity is maintained because there is no change in the natural period T compared with the natural period threshold value, the degree of damage of the building is estimated as follows. Because there is no change in the natural period T, it can be estimated that the damage is less than or equal to the assumed value although the inter-story deformation angle Δ exceeds the designed inter-story deformation angle because the structural skeleton of the building has actually been constructed at the inter-story deformation angle greater than the designed inter-story deformation angle in design. Thereby, the determination result represents that "continuous use is possible, but it should be used with caution".

Parameter Pattern C

When it is determined that the inter-story deformation angle Δ is less than or equal to the designed inter-story deformation angle but the rigidity decreases because the natural period T is longer than the natural period threshold value, a degree of damage of the building is estimated as follows. Because the natural period T becomes long but the inter-story deformation angle Δ is less than or equal to the designed inter-story deformation, a component not belonging to the structural skeleton of the building is damaged, rather than the structural skeleton, and it can be estimated that the damage of the structural skeleton is less than or equal to an assumed value. Thereby, the determination result represents that "continuous use is possible, but it should be used with caution".

Parameter Pattern D

When it is determined that the inter-story deformation angle Δ is less than or equal to the designed inter-story deformation angle and the rigidity is maintained because there is no change in the natural period T compared with the natural period threshold value, the degree of damage of the building is estimated as follows. Because the inter-story deformation angle Δ is less than or equal to the designed inter-story deformation angle and the rigidity is maintained because the natural period T does not change, it can be estimated that neither the structural skeleton of the building nor any component not belonging to the structural skeleton of the build is damaged and the damage to the structural skeleton is less than or equal to an assumed value. Thereby, the determination result represent that "continuous use is possible."

In the present embodiment, the building safety evaluation unit 13 makes the above-described determination based on the determination table illustrated in FIG. 3 for each floor of the building 100 using the natural period T of the building 100 and the inter-story deformation angle Δ of each floor. Then, the building safety evaluation unit 13 writes the determination result in the determination result table of the database 14 to cause the written determination result to be stored for each floor of the building 100. Building identification information for identifying each building is added to the determination result table for each building, and the determination result table is written in the database 14.

FIG. 4 is a diagram illustrating an example of a configuration of the determination result table stored in the database 14. In FIG. 4, the determination result table includes a floor number of a floor, the determination result, and a countermeasure for each floor of the building 100. In the present embodiment, for example, a degree of urgency of evacuation after the earthquake is set as the countermeasure. A user sets items of the countermeasure in a timely manner or the building safety evaluation unit 13 determines the items of the countermeasure as described below.

As in FIG. 4, it is determined that "continuous use is possible" for the first floor $100_1$, it is determined that "continuous use is possible, but it should be used with caution" for the second floor $100_2$, it is determined that "rapid examination is necessary" for the second floor $100_3$, and it is determined that "continuous use is possible, but it should be used with caution" for the fourth floor $100_4$.

In this case, because the third floor $100_3$ is in a dangerous state, for example, it is necessary to evacuate people in the floors above the third floor $100_3$ before aftershock comes, and thus the countermeasure becomes "rapid evacuation" Because there is a danger when people being evacuated are concentrated, there is a countermeasure of "wait until instruction is received" so that people on floors lower than the floor on which it is determined that "rapid examination is necessary," that is, people on the second floor $100_2$ and the first floor $100_1$ in this case, wait for an evacuation instruction to be received. The building safety evaluation unit 13 determines the countermeasures for the determination results in accordance with a preset rule (a rule associating combinations of patterns of degrees of damage in the floors and countermeasures for the combinations) and writes the determined countermeasures in a corresponding field of the determination result table of the database 14 illustrated in FIG. 4 to store the written determined countermeasures.

Figure 5:
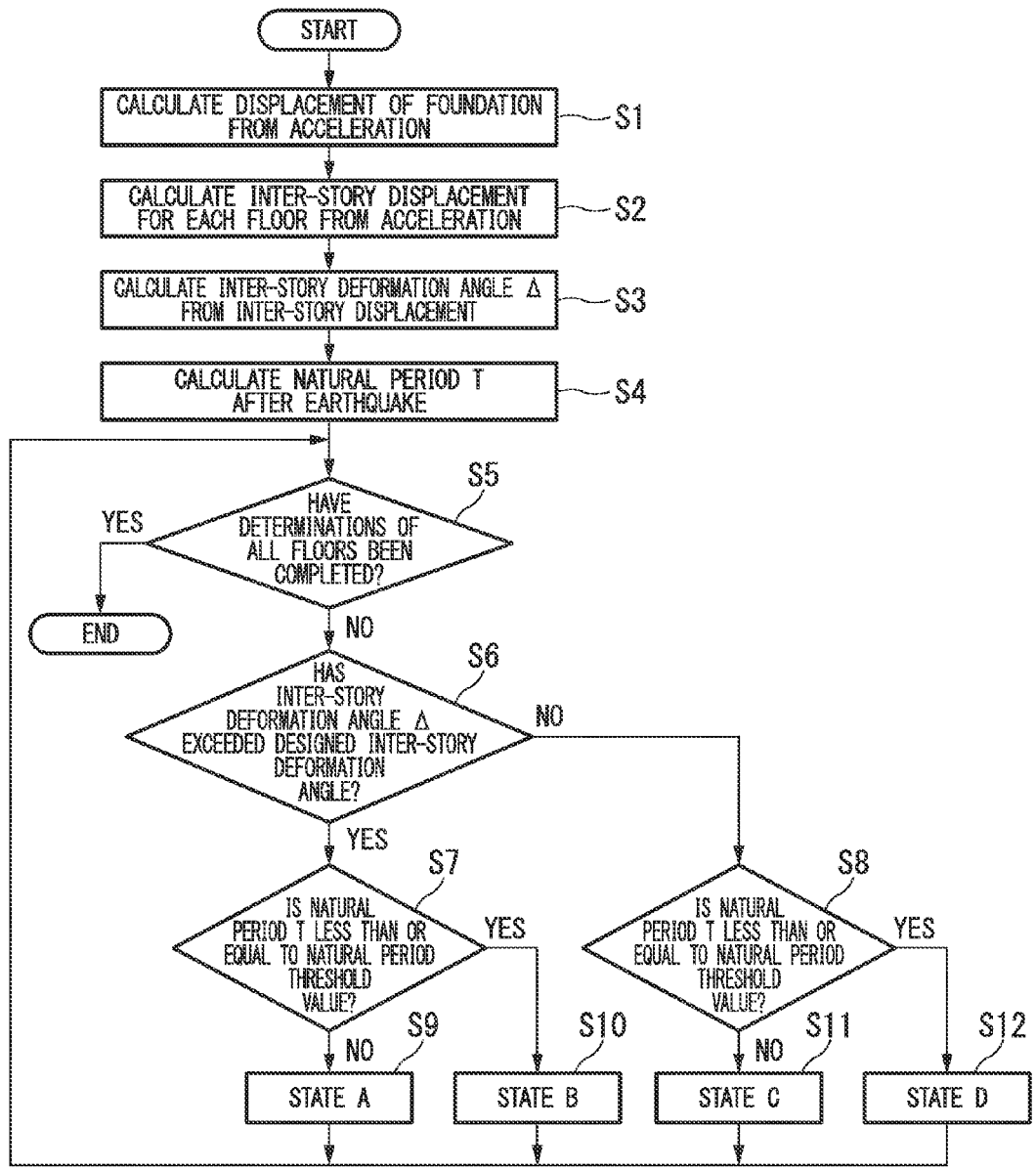
FIG. 5 is a flowchart illustrating a flow of a process in which the building safety verification system 1 in accordance with the present embodiment verifies the safety of the building.

Next, a process in which the building safety verification system 1 in accordance with the present embodiment verifies the safety of the building will be described with reference to FIG. 5. FIG. 5 is a flowchart illustrating a flow of the process in which the building safety verification system 1 in accordance with the preset embodiment verifies the safety of the building. The building safety verification system 1 performs an operation of the flowchart of FIG. 5 for each floor after the earthquake occurs and determines the safety for each floor of the building 100. If the building 100 has n floors, a determination process based on the flowchart is performed in order from the first floor $100_1$ to the $n^{th}$ floor $100_n$. When acceleration measured by the acceleration sensor $S_0$ supplied from the acceleration sensor $S_0$ is greater than or equal to a predetermined earthquake determination threshold value, the inter-story displacement measurement unit 11 determines that an earthquake occurs and executes the process of the following flowchart.

Step S1:

The inter-story displacement measurement unit 11 extracts acceleration from acceleration data supplied from the acceleration sensor $S_0$ measured by the acceleration sensor $S_0$. Then, the inter-story displacement measurement unit 11 integrates the extracted acceleration twice to calculate a displacement of the foundation portion.

Step S2:

The inter-story displacement measurement unit 11 extracts acceleration of each acceleration sensor $S_k$ disposed in a $k^{th}$ floor $100_k$ (1≤k≤n) of the building 100 from each acceleration supplied from each acceleration sensor $S_k$ and measured by the acceleration sensor $S_k$. Then, the inter-story displacement measurement unit 11 integrates the extracted acceleration twice to calculate a displacement of each floor, and calculates a difference from a displacement of an adjacent floor to calculate an inter-story displacement δ of each floor. Here, the inter-story displacement δ of the first floor $100_1$ of the building 100 is obtained by subtracting a displacement of the foundation $100_0$ from the displacement of the first floor $100_1$.

Step S3:

The inter-story displacement measurement unit 11 divides each calculated inter-story displacement δ of the $k^{th}$ floor $100_k$ by a height of the $k^{th}$ floor $100_k$ to calculate an inter-story displacement angle Δ of the $k^{th}$ floor $100_k$.

Step S4:

The natural period measurement unit 12 performs signal processing on micro vibration data supplied from the micro vibration sensor SB disposed in the rooftop $100_8$ after the earthquake occurs. That is, the natural period measurement unit 12 performs Fourier analysis of the micro vibration data, extracts a frequency having the highest power spectrum, and designates this frequency as a natural frequency. Then, the natural period measurement unit 12 obtains a period corresponding to the extracted natural frequency and designates this period as a natural period T.

Step S5:

The building safety evaluation unit 13 determines whether determinations of degrees of damage of all floors from the first floor $100_1$ to the $n^{th}$ floor $100_n$ in the building 100 have been made.

At this time, the building safety evaluation unit 13 ends the process when the determinations for all the floors in the building 100 have been completed, and the process proceeds to step S6 when the determinations for all the floors in the building 100 have not been completed.

Step S6:

The building safety evaluation unit 13 reads the inter-story deformation angle Δ of a floor for which the determination of the building 100 has not been completed from the inter-story displacement measurement unit 11, compares the read inter-story deformation angle Δ of the $k^{th}$ floor $100_k$ of the determination target with the designed inter-story deformation angle, and determines whether the inter-story deformation angle Δ exceeds the designed inter-story deformation angle (obtains a first determination result). At this time, the building safety evaluation unit 13 moves the process to step S7 if the inter-story deformation angle Δ exceeds the designed inter-story deformation angle and moves the process to step S8 if the inter-story deformation angle Δ does not exceed the designed inter-story deformation angle.

Step S7:

The building safety evaluation unit 13 compares the natural period T supplied from the natural period measurement unit 12 with the natural period threshold value and determines whether the natural period T is less than or equal to the natural period threshold value (obtains a second determination result). At this time, the building safety evaluation unit 13 moves the process to step S9 if the natural period T exceeds the natural period threshold value and moves the process to step S10 if the natural period T is less than or equal to the natural period threshold value. In the description here, a natural period threshold value having a margin for an initial value of the natural period is used instead of the initial value of the natural period of the building 100.

Step S8:

The building safety evaluation unit 13 compares the natural period T supplied from the natural period measurement unit 12 with the natural period threshold value and determines whether the natural period T is less than or equal to the natural period threshold value (obtains the second determination result). At this time, the building safety evaluation unit 13 moves the process to step S11 if the natural period T exceeds the natural period threshold value and moves the process to step S12 if the natural period T is less than or equal to the natural period threshold value.

Step S9:

The building safety evaluation unit 13 refers to the determination table of the database 14 and detects that the parameter pattern is a state A if the inter-story deformation angle Δ exceeds the designated inter-story deformation angle and the natural period T exceeds the natural period threshold value.

Next, the building safety evaluation unit 13 writes "rapid examination is necessary (A)" as a result of the determination indicating that the parameter pattern is the state A in a field of the determination result corresponding to the $k^{th}$ floor $100_k$ of the evaluation target in the determination result table of the database 14 to store the written content and moves the process to step S5.

Step S10:

The building safety evaluation unit 13 refers to the determination table of the database 14 and detects that the parameter pattern is a state B if the inter-story deformation angle Δ exceeds the designed inter-story deformation angle and the natural period T is less than or equal to the natural period threshold value.

Next, the building safety evaluation unit 13 writes "continuous use is possible, but it should be used with caution (B)" as a result of the determination indicating that the parameter pattern is the state B in a field of the determination result corresponding to the $k^{th}$ floor $100_k$ in the determination result table of the database 14 to store the written content and moves the process to step S5.

Step S11:

The building safety evaluation unit 13 refers to the determination table of the database 14 and detects that the parameter pattern is a state C if the inter-story deformation angle Δ is less than or equal to the designed inter-story deformation angle and the natural period T is not less than or equal to the natural period threshold value.

Next, the building safety evaluation unit 13 writes "continuous use is possible, but it should be used with caution (C)" as a result of the determination indicating that the parameter pattern is the state C in a field of the determination result corresponding to the $k^{th}$ floor $100_k$ in the determination result table of the database 14 to store the written content and moves the process to step S5.

Step S12:

The building safety evaluation unit 13 refers to the determination table of the database 14 and detects that the parameter pattern is a state D if the inter-story deformation angle Δ is less than or equal to the designed inter-story deformation angle and the natural period T is less than or equal to the natural period threshold value.

Next, the building safety evaluation unit 13 writes "continuous use is possible (D)" as a result of the determination indicating that the parameter pattern is the state D in a field of the determination result corresponding to the $k^{th}$ floor $100_k$ in the determination result table of the database 14 to store the written content and moves the process to step S5.

By performing the above-described process, the building safety verification system 1 of the present embodiment determines a degree of damage in each floor of the building 100 using a combination of the natural period T of the building 100 and the inter-story deformation angle Δ of the $k^{th}$ floor $100_k$ in the building 100. Thereby, the building safety verification system 1 of the present embodiment can estimate and determine an individual degree of damage of each floor with higher precision than the conventional art so as to conform to the designed inter-story deformation angle of an actually constructed building by making a determination in combination with a natural period of the building 100 even when the building 100 is constructed with a value different from the designed inter-story deformation angle which is a designed standard value. In addition, the building safety verification system 1 of the present embodiment can deal with a construction error, aging deterioration, a weight change of an installed object within a building such as furniture, a change of a condition such as a rigidity of a structural skeleton or a non-structural member, or the like, estimate an individual degree of damage of each floor in the building 100 with higher precision than the conventional art, and determine the safety of the building.

In addition, the building safety verification system 1 of the present embodiment writes the determination result of each floor (a floor in which an acceleration sensor is provided) in the determination result table in the database 14, so that it is possible to determine, for example, priority of evacuation after the earthquake for each floor in the building 100 in accordance with the determined result and efficiently perform evacuation guidance as described above.

In addition, although the acceleration sensors are provided on all floors of the building 100 in the present embodiment, acceleration sensors may be provided in some stories among a plurality of floors (a plurality of stories), for example, such as every other floor, and the damage to the floors in which the acceleration sensors are provided may be determined.

Second Embodiment

Figure 6:
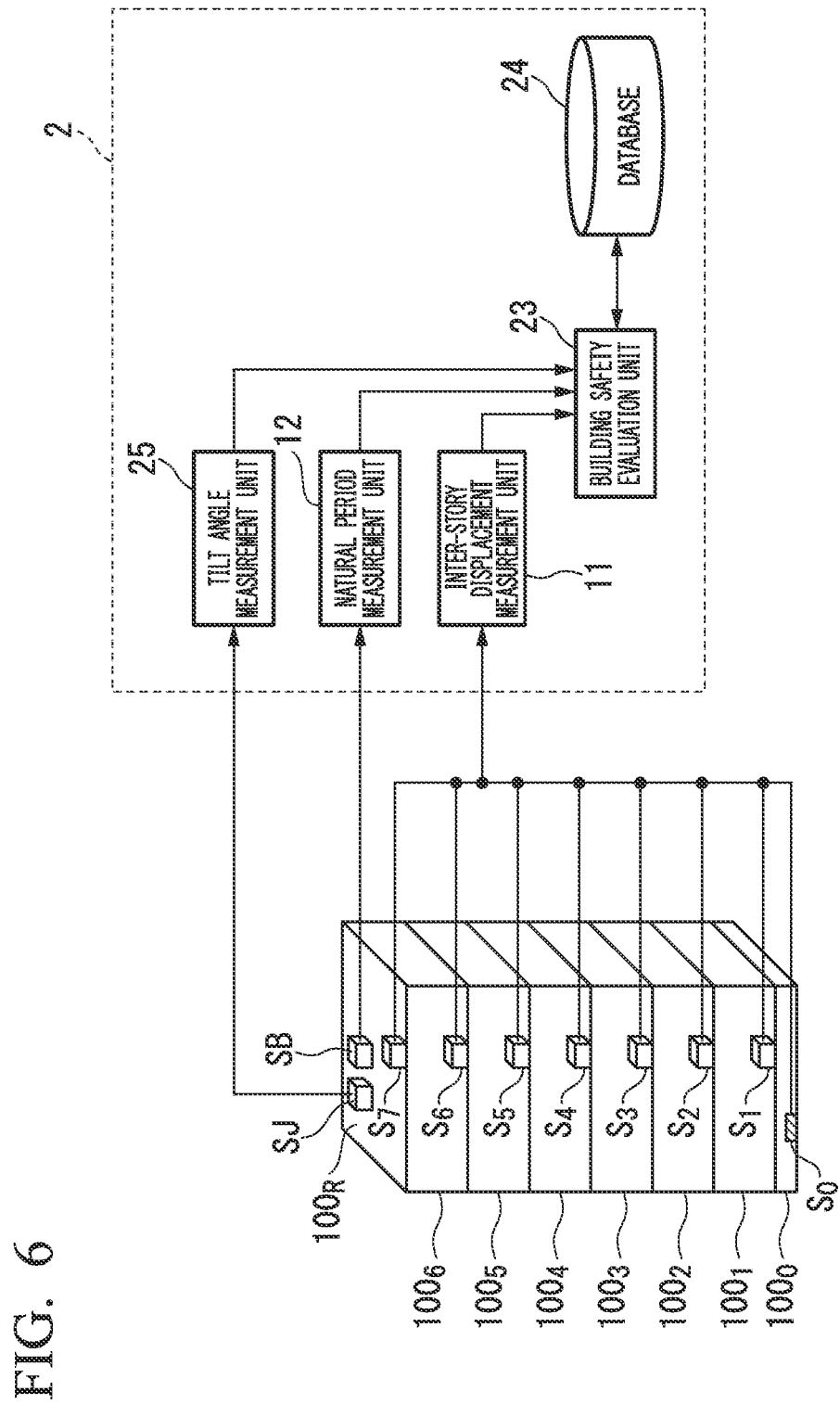
FIG. 6 is a conceptual diagram illustrating an example of a configuration in which a building safety verification system in accordance with a second embodiment of the present invention is connected to acceleration sensors, a micro vibration sensor, and a tilt sensor provided in a building serving as an evaluation target.

Hereinafter, a building safety verification system in accordance with the second embodiment of the present invention will be described using the drawings. FIG. 6 is a conceptual diagram illustrating an example of a configuration in which the building safety verification system in accordance with the second embodiment of the present invention is connected to acceleration sensors, a micro vibration sensor, and a tilt sensor provided in a building serving as an evaluation target.

In FIG. 6, as in the first embodiment, acceleration data is supplied from each of acceleration sensors $S_0$ to $S_n$ (0 denotes a foundation and 1 to n denote floor numbers of the building) provided in the building 100 to the building safety verification system 2 via an information communication network including the Internet or the like as vibration data of an earthquake. Installation positions of the acceleration sensor $S_0$ and the acceleration sensors $S_1$ to $S_n$ are the same as those in the first embodiment. In addition, in the second embodiment, a tilt sensor SJ is disposed in a rooftop $100_8$ of the building 100 in addition to a micro vibration sensor SB. Similar to the micro vibration sensor SB, this tilt sensor SJ may be disposed in an upper portion (for example, a ceiling or the like of an $n^{th}$ floor in an n-floor building) of the highest floor near the rooftop $100_R$, rather than the rooftop $100_R$.

The building safety verification system 2 includes an inter-story displacement measurement unit 11, a natural period measurement unit 12, a building safety evaluation unit 23, a database 24, and a tilt angle measurement unit 25. The inter-story displacement measurement unit 11 and the natural period measurement unit 12 have the same configurations as those of the inter-story displacement measurement unit 11 and the natural period measurement unit 12 in the first embodiment, respectively.

The tilt angle measurement unit 25 calculates a tilt angle $\theta$ of the building 100 relative to an axis having a direction perpendicular to a horizon plane based on tilt data supplied from the tilt sensor SJ disposed in the rooftop $100_8$ of the building 100. In the present embodiment, the inter-story deformation angle $\Delta$, the natural period T, and the tilt angle $\theta$ are represented as absolute values.

The building safety evaluation unit 23 determines a degree of damage of a structural skeleton from the inter-story deformation angle $\Delta$ obtained by the inter-story displacement measurement unit 11, the natural period T of the building obtained by the natural period measurement unit 12, and the tilt angle $\theta$ obtained by the tilt angle measurement unit 25. That is, the building safety evaluation unit 23 compares the inter-story deformation angle $\Delta$ with a preset designed inter-story deformation angle and determines whether the inter-story deformation angle $\Delta$ exceeds the designed inter-story deformation angle. In addition, the building safety evaluation unit 23 compares the natural period T with an initial value of the natural period and determines whether the natural period T is less than or equal to the initial value of the natural period. In addition, the building safety evaluation unit 23 compares the tilt angle $\theta$ with an initial value of the tilt angle (for example, a tilt angle measured immediately after construction of the building) and determines whether the tilt angle $\theta$ is less than or equal to the initial value.

In addition, instead of the initial value of the natural period, a natural period threshold value may be generated by adding a margin of a change with time to the initial value of the natural period and the natural period threshold value may be compared with the natural period T. Here, the initial value of the natural period<the natural period threshold value is satisfied.

Figure 7:
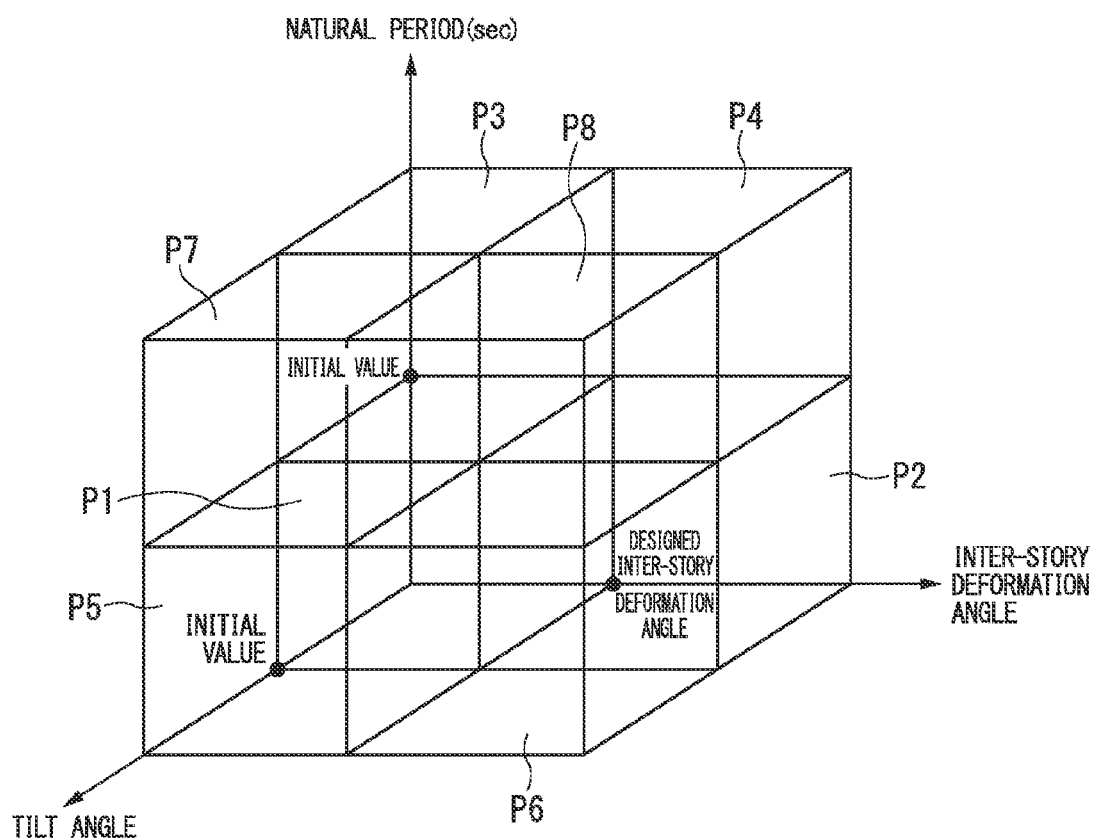
FIG. 7 is a diagram illustrating an example of a configuration of combinations of parameter patterns in a determination table stored in a database 24 of FIG. 6.

FIG. 7 is a diagram illustrating an example of a configuration of combinations of parameter patterns in a determination table stored in the database 24 of FIG. 6. This determination table shows a determination result of the soundness of the building based on a combination of a result of comparing the inter-story deformation angle $\Delta$ with the designed inter-story deformation angle, a result of comparing the natural period T with the initial value of the natural period, and a result of comparing the tilt angle $\theta$ with the initial value (tilt angle threshold value) of the tilt angle. The designed inter-story deformation angle is set to a value at which a member of a structural skeleton has damage such as deformation when an inter-story displacement exceeding the value of the designed inter-story deformation angle has occurred. Hereinafter, a determination of the soundness of the building corresponding to a parameter pattern indicating a pattern of a determination using the natural period T, the inter-story deformation angle $\Delta$, and the tilt angle $\theta$ is shown. In FIG. 7, a three-dimensional determination space is divided into eight regions of patterns P1 to P8.

Pattern P1 is a pattern in which the inter-story deformation angle $\Delta$ is less than or equal to the designed inter-story deformation angle, the natural period T is less than or equal to the natural period threshold value, and the tilt angle $\theta$ is less than or equal to the initial value of the tilt angle.

Pattern P2 is a pattern in which the inter-story deformation angle $\Delta$ exceeds the designed inter-story deformation angle, the natural period T is less than or equal to the natural period threshold value, and the tilt angle $\theta$ is less than the initial value of the tilt angle.

Pattern P3 is a pattern in which the inter-story deformation angle $\Delta$ is less than or equal to the designed inter-story deformation angle, the natural period T exceeds the natural period threshold value, and the tilt angle $\theta$ is less than or equal to the initial value of the tilt angle.

Pattern P4 is a pattern in which the inter-story deformation angle $\Delta$ exceeds the designed inter-story deformation angle, the natural period T exceeds the natural period threshold value, and the tilt angle $\theta$ is less than or equal to the initial value of the tilt angle.

Pattern P5 is a pattern in which the inter-story deformation angle Δ is less than or equal to the designed inter-story deformation angle, the natural period T is less than or equal to the natural period threshold value, and the tilt angle θ exceeds the initial value of the tilt angle.

Pattern P6 is a pattern in which the inter-story deformation angle Δ exceeds the designed inter-story deformation angle, the natural period T is less than or equal to the natural period threshold value, and the tilt angle θ exceeds the initial value of the tilt angle.

Pattern P7 is a pattern in which the inter-story deformation angle Δ is less than or equal to the designed inter-story deformation angle, the natural period T exceeds the natural period threshold value, and the tilt angle θ exceeds the initial value of the tilt angle.

Pattern P8 is a pattern in which the inter-story deformation angle Δ exceeds the designed inter-story deformation angle, the natural period T exceeds the natural period threshold value, and the tilt angle θ exceeds the initial value of the tilt angle.

In the present embodiment, the above-described patterns P1 to P8 are classified into five determination groups (states) as shown below. Determination results corresponding to the determination groups are written and stored in the database 24 as a determination table in advance.

Determination Group D: Patterns P1 and P2
Determination result: continuous use is possible
Determination reason: for the pattern P1, it is determined that the building 100 is not damaged because the inter-story deformation angle Δ is less than or equal to the designed inter-story deformation angle, the natural period T is less than or equal to the natural period threshold value, and the tilt angle θ is less than or equal to the initial value of the tilt angle. In addition, for the pattern P2, it is determined that the building 100 is not damaged because the inter-story deformation angle Δ exceeds the designed inter-story deformation angle, but the natural period T is less than or equal to the natural period threshold value and the tilt angle θ is less than or equal to the initial value of the tilt angle. Here, it is estimated that the building 100 is constructed such that actual performance of the building 100 in terms of earthquake-resistance is higher than that in design from the fact that although the inter-story deformation angle Δ exceeds the designed inter-story deformation angle, the natural period T is less than or equal to the natural period threshold value and the tilt angle θ is less than or equal to the initial value of the tilt angle.

Determination Group E: Patterns P5 and P6
Determination result: it can be determined that use is possible for emergency restoration, but it is necessary to examine whether use is possible at normal times
Determination reason: when the natural period T is less than or equal to the natural period threshold value and the tilt angle θ of the building 100 exceeds the tilt angle threshold value, it is estimated that the ground on which the building 100 stands is damaged.

Determination Group F: Pattern P7
Determination result: there is a possibility of damage to a non-structural member and examination is necessary even when the building is used for emergency restoration.
Determination reason: when the natural period T exceeds the natural period threshold value, the tilt angle θ of the building 100 exceeds the tilt angle threshold value, and the inter-story deformation angle Δ is less than or equal to the designed inter-story deformation angle, it is estimated that the non-structural member of the building 100 and the ground on which the building 100 stands are damaged.

Determination Group G: Patterns P3 and P4
Determination result: there is a possibility of damage to a non-structural member and examination is necessary even when the building is used for emergency restoration, but continuous use is possible at normal times if the non-structural member is repaired.
Determination reason: because the tilt angle θ of the building 100 is less than or equal to the tilt angle threshold value but the natural period T exceeds the natural period threshold value, it is estimated that the structural skeleton of the building 100 is not damaged but there is a possibility of damage to a component not belonging to the structural skeleton.

Determination Group H: Pattern P8
Determination result: continuous use is impossible
Determination reason: because the tilt angle θ of the building 100 exceeds the tilt angle threshold value, the natural period T exceeds the natural period threshold value, and the inter-story deformation angle Δ exceeds the designed inter-story deformation angle, it is estimated that there is a possibility of damage to the structural skeleton of the building 100, a component not belonging to the structural skeleton, and the ground.

Next, a process in which the building safety verification system 2 in accordance with the present embodiment verifies the safety of the building will be described with reference to FIG. 8. FIG. 8 is a flowchart illustrating a flow of a process in which the building safety verification system 2 in accordance with the present embodiment verifies the safety of the building. The building safety verification system 2 performs an operation of the flowchart of FIG. 8 for each floor after the earthquake occurs and determines the safety for each floor of the building 100. If the building 100 has n floors, a determination process based on the flowchart is performed in order from the first floor $100_1$ to the $n^{th}$ floor $100_n$. When earth motion acceleration supplied from the acceleration sensor $S_0$ is greater than or equal to a predetermined earthquake determination threshold value, the inter-story displacement measurement unit 11 determines that an earthquake occurs and executes the process of the following flowchart.

Step S21:
The inter-story displacement measurement unit 11 extracts acceleration from acceleration data supplied from the acceleration sensor measured by the acceleration sensor $S_0$. Then, the inter-story displacement measurement unit 11 integrates the extracted acceleration twice to calculate a displacement of the foundation portion.

Step S22:
The inter-story displacement measurement unit 11 extracts acceleration of each acceleration sensor $S_k$ from the acceleration data supplied from each acceleration sensor $S_k$ disposed in a $k^{th}$ floor $100_k$ (1≤k≤n) of the building 100 and measured by each acceleration sensor $S_k$. Then, the inter-story displacement measurement unit 11 integrates the extracted acceleration twice to calculate a displacement of each floor, and calculates a difference from a displacement of each adjacent floor to calculate an inter-story displacement δ of each floor. Here, the inter-story displacement δ of the first floor $100_1$ of the building 100 is obtained by subtracting a displacement of the foundation $100_0$ from the displacement of the first floor $100_1$.

It is to be noted that when an inter-story displacement is calculated for a building or the like in which overall bending deformation or rocking is dominant, a shear deformation component is more precisely calculated by using measurement data of the tilt angle θ.

Step S23:

The inter-story displacement measurement unit 11 divides a calculated inter-story displacement δ of a $k^{th}$ floor 100$_k$ by a height of the $k^{th}$ floor 100$_k$ to calculate an inter-story displacement angle Δ of the $k^{th}$ floor 100$_k$. It is to be noted that methods other than that disclosed in the present embodiment may be used as a method for obtaining a displacement from acceleration data. In particular, a method for obtaining an inter-story displacement or an inter-story deformation angle by constructing a vibration analysis model of a target building and fitting various factors of the vibration analysis model to a real building using a measured natural frequency and a measured acceleration of each floor may also be used.

Step S24:

The natural period measurement unit 12 performs signal processing on micro vibration data supplied from the micro vibration sensor SB disposed in the rooftop 100$_R$ after the earthquake occurs. That is, the natural period measurement unit 12 performs Fourier analysis of micro vibration data, extracts a frequency having the highest power spectrum, and designates this frequency as a natural frequency. Then, the natural period measurement unit 12 obtains a period corresponding to the extracted natural frequency and designates the period as a natural period T. Further, a configuration in which the micro vibration sensor is provided in each floor and the natural frequency is obtained for each floor may be provided.

Step S25:

The tilt angle measurement unit 25 obtains the tilt angle θ of the building 100 from tilt angle data supplied from the tilt angle sensor SJ disposed in the rooftop 100$_R$ of the building 100.

Step S26:

The building safety evaluation unit 23 determines whether determinations of degrees of damage in all floors from the first floor 100$_1$ to the $n^{th}$ floor 100$_n$ in the building 100 have been made.

At this time, the building safety evaluation unit 23 ends the process when the determinations for all the floors in the building 100 have been completed, and moves the process to step S27 when the determinations for all the floors in the building 100 have not been completed.

Step S27:

The building safety evaluation unit 23 compares the tilt angle θ supplied from the tilt angle measurement unit 25 with the initial value of the tilt angle of the building 100 and determines whether the tilt angle θ exceeds the initial value of the tilt angle (obtains a third determination result). At this time, the building safety evaluation unit 23 moves the process to step S28 if the tilt angle θ does not exceed the initial value of the tilt angle and moves the process to step S29 if the tilt angle θ exceeds the initial value of the tilt angle.

Step S28:

The building safety evaluation unit 23 compares the natural period T supplied from the natural period measurement unit 12 with the natural period threshold value and determines whether the natural period T is less than or equal to the natural period threshold value (obtains a second determination result). At this time, the building safety evaluation unit 23 moves the process to step S32 if the natural period T exceeds the natural period threshold value and moves the process to step S31 if the natural period T is less than or equal to the natural period threshold value. In the description here, a natural period threshold value having a margin for an initial value of the natural period is used instead of the initial value of the natural period of the building 100.

Step S29:

The building safety evaluation unit 23 compares the natural period T supplied from the natural period measurement unit 12 with the natural period threshold value and determines whether the natural period T is less than or equal to the natural period threshold value. At this time, the building safety evaluation unit 23 moves the process to step S30 if the natural period T exceeds the natural period threshold value and moves the process to step S33 if the natural period T is less than or equal to the natural period threshold value.

Step S30:

The building safety evaluation unit 23 reads the inter-story deformation angle Δ of a floor for which the determination of the building 100 has not been completed from the inter-story displacement measurement unit 11, compares the read inter-story deformation angle Δ of the $k^{th}$ floor 100$_k$ of the determination target with the designed inter-story deformation angle, and determines whether the inter-story deformation angle Δ exceeds the designed inter-story deformation angle (obtains a first determination result). At this time, the building safety evaluation unit 23 moves the process to step S35 if the inter-story deformation angle Δ exceeds the designed inter-story deformation angle and moves the process to step S34 if the inter-story deformation angle Δ does not exceed the designed inter-story deformation angle.

Step S31:

The building safety evaluation unit 23 refers to the determination table of the database 24 and detects that the parameter pattern is a state D when the tilt angle θ is less than or equal to the initial value of the tilt angle and the natural period T is less than or equal to the natural period threshold value.

Next, the building safety evaluation unit 23 writes "continuous use is possible (D)" as a result of the determination indicating that the parameter pattern is the state D in a field of the determination result corresponding to the $k^{th}$ floor 100$_k$ in the determination result table of the database 24 to store the written content and moves the process to step S26.

Step S32:

The building safety evaluation unit 23 refers to the determination table of the database 24 and detects that the parameter pattern is a state G when the tilt angle θ is less than or equal to the initial value of the tilt angle and the natural period T exceeds the natural period threshold value.

Next, the building safety evaluation unit 23 writes "there is a possibility of damage to a non-structural member and examination is necessary even when the building is used for emergency restoration, but continuous use is possible at normal times if the non-structural member is repaired (G)" as a result of the determination indicating that the parameter pattern is the state G in a field of the determination result corresponding to the $k^{th}$ floor 100$_k$ in the determination result table of the database 24 to store the written content and moves the process to step S26.

Step S33:

The building safety evaluation unit 23 refers to the determination table of the database 24 and detects that the parameter pattern is a state E when the tilt angle θ exceeds the initial value of the tilt angle and the natural period T is less than or equal to the natural period threshold value.

Next, the building safety evaluation unit 23 writes "it is determined that use is possible for emergency restoration, but it is necessary to examine whether use is possible at normal times (E)" as a result of the determination indicating that the parameter pattern is the state E in a field of the determination result corresponding to the $k^{th}$ floor $100_k$ in the determination result table of the database 24 to store the written content and moves the process to step S26.

Step S34:

The building safety evaluation unit 23 refers to the determination table of the database 24 and detects that the parameter pattern is a state F when the tilt angle θ exceeds the initial value of the tilt angle, the natural period T exceeds the natural period threshold value, and the inter-story deformation angle Δ is less than or equal to the designed inter-story deformation angle.

Next, the building safety evaluation unit 23 writes "there is a possibility of damage to a non-structural member and examination is necessary even when the building is used for emergency restoration (F)" as a result of the determination indicating that the parameter pattern is the state F in a field of the determination result corresponding to the $k^{th}$ floor $100_k$ in the determination result table of the database 24 to store the written content and moves the process to step S26.

Step S35:

The building safety evaluation unit 23 refers to the determination table of the database 24 and detects that the parameter pattern is a state H when the tilt angle θ exceeds the initial value of the tilt angle, the natural period T exceeds the natural period threshold value, and the inter-story deformation angle Δ exceeds the designed inter-story deformation angle.

Next, the building safety evaluation unit 23 writes "continuous use is impossible (H)" as a result of the determination indicating that the parameter pattern is the state H in a field of the determination result corresponding to the $k^{th}$ floor $100_k$ in the determination result table of the database 24 to store the written content and moves the process to step S26.

By performing the above-described process, the building safety verification system 2 of the present embodiment determines a degree of damage in each floor of the building 100 from a combination of the natural period T of the building 100, the inter-story deformation angle Δ of the $k^{th}$ floor $100_k$ in the building 100, and the tilt angle θ of the building 100. Thereby, the building safety verification system 2 of the present embodiment can estimate and determine an individual degree of damage of each floor and a degree of damage of the ground with higher precision than the conventional art so as to conform to the designed inter-story deformation angle of an actually constructed building by making a determination in combination with a natural period and a tilt angle of the building 100 even when the building 100 is constructed with the value different from the designed inter-story deformation angle which is a designed standard value. In addition, the building safety verification system 2 of the present embodiment can deal with a construction error, aging deterioration, a weight change of an installed object within a building such as furniture, a change of a condition such as a rigidity of a structural skeleton or a non-structural member, or the like changes, estimate an individual degree of damage of each floor in the building 100 and a degree of damage of the ground with higher precision than in the conventional art, and determine the safety of the building. That is, in accordance with the present embodiment, it is possible to distinguish between the damage to a structural skeleton in the building 100, the damage to components not belonging to the structural skeleton, and the damage to the ground (estimation using a tilt angle θ of the building) by adding the determination of the tilt angle to the determination based on the inter-story deformation angle of each floor and the natural period. Thus, the building safety verification system 2 of the present embodiment can determine a more detailed state of the building 100 than that of the first embodiment. In addition, in accordance with the building safety verification system 2 of the present embodiment, the determination result of each floor is written in the determination result table of the database 24, so that it is possible to determine priority of evacuation or the like after the earthquake for each floor of the building 100 in accordance with the determined result as described above.

It is to be noted that a processing operation of evaluating earthquake resistance (estimation of damage by an earthquake or the like) of a building may be performed by recording a program for implementing the building safety verification system 1 or 2 in FIG. 1 or 6, respectively, on a computer-readable recording medium and causing a computer system to read and execute the program recorded on the recording medium. It is to be noted that the "computer system" used here is assumed to include an operating system (OS) and hardware such as peripheral devices. In addition, the "computer system" is assumed to include a World Wide Web (WWW) system having a homepage providing environment (or displaying environment). In addition, the "computer-readable recording medium" refers to a portable medium such as a flexible disk, a magneto-optical disc, a read only memory (ROM), or a compact disc (CD)-ROM, and a storage apparatus such as a hard disk embedded in the computer system. Furthermore, the "computer-readable recording medium" is assumed to include a medium that holds a program for a constant period of time, such as a volatile memory (random access memory (RAM)) inside a computer system serving as a server or a client when the program is transmitted via a network such as the Internet or a communication circuit such as a telephone circuit.

In addition, the program may be transmitted from a computer system storing the program in a storage apparatus or the like via a transmission medium or transmission waves in the transmission medium to another computer system. Here, the "transmission medium" for transmitting the program refers to a medium having a function of transmitting information, such as a network (communication network) like the Internet or a communication circuit (communication line) like a telephone circuit. In addition, the program may be a program for implementing part of the above-described functions. Further, the program may be a program, i.e., a so-called differential file (differential program), capable of implementing the above-described functions in combination with a program already recorded on the computer system.

While the embodiments of the present invention have been described with reference to the drawings, it is apparent that the above embodiments are exemplary of the present invention and the present invention is not limited to the above embodiments. Therefore, additions, omissions, substitutions, and other modifications of structural elements can be made without departing from the technical idea and scope of the present invention.

INDUSTRIAL APPLICABILITY

The present invention, for example, can be used for applications in estimating an influence of an earthquake on a building. In accordance with the present invention, it is possible to provide a building safety verification system and a building safety verification method for estimating a degree of damage of a building after an earthquake occurs.

DESCRIPTION OF REFERENCE SIGNS 1, 2 Building safety verification system
11 Inter-story displacement measurement unit
12 Natural period measurement unit
13, 23 Building safety evaluation unit
14, 24 Database
25 Tilt angle measurement unit
$S_0, S_1, S_2, S_3, S_4, S_5, S_6$ Acceleration sensor
100 Building
$100_1$ First floor
$100_2$ Second floor
$100_3$ Third floor
$100_4$ Fourth floor
$100_5$ Fifth floor
$100_6$ Sixth floor
$100_0$ Foundation
$100_R$ Rooftop
SB Micro vibration sensor
SJ Tilt angle sensor

We claim:

1. A building safety verification system comprising:
a plurality of acceleration sensors which measure accelerations of a plurality of stories in a building;
an inter-story displacement measurement unit which receives the measured accelerations from the plurality of acceleration sensors and obtains an inter-story displacement of each of the stories by integrating each of the measured accelerations twice;
a natural period measurement unit which obtains a natural period of microtremor of the building from measurement data of a micro vibration sensor which measures micro vibration of a highest story of the building or a story near the highest story; and
a building safety evaluation unit which evaluates soundness of the building from the inter-story displacement obtained by the inter-story displacement measurement unit and the natural period obtained by the natural period measurement unit;
wherein the building safety evaluation unit evaluates the soundness of the building from a first determination result of determining whether the inter-story displacement exceeds a preset inter-story displacement threshold value; and
wherein the building safety evaluation unit determines a final determination result based on the first determination result, and wherein the final determination result includes one of (a) continuous use is possible, (b) continuous use is possible but it should be used with caution, and (c) rapid examination is necessary.

2. The building safety verification system according to claim 1, wherein, when the building safety evaluation unit determines that the inter-story displacement exceeds a preset inter-story displacement threshold value, the final determination result is that rapid examination is necessary.

3. The building safety verification system according to claim 1 or 2, wherein the building safety evaluation unit determines a countermeasure based on the final determination.

4. The building safety verification system according to claim 3, wherein the countermeasure includes a degree of urgency of evacuation.

5. A building safety verification method comprising:
an acceleration measurement step of measuring, by a plurality of acceleration sensors, accelerations of a plurality of stories in a building;
an inter-story displacement measurement step of receiving the measured accelerations from the plurality of acceleration sensors and obtaining, by an inter-story displacement measurement unit, an inter-story displacement of each of the stories by integrating each of the measured accelerations twice;
a natural period measurement step of obtaining, by a natural period measurement unit, a natural period of microtremor of the building from measurement data of a micro vibration sensor which measures micro vibration of a highest story of the building or a story near the highest story;
a building safety evaluation step of evaluating, by a building safety evaluation unit, soundness of the building from the inter-story displacement obtained by the inter-story displacement measurement unit and the natural period obtained by the natural period measurement unit;
wherein the building safety evaluation unit evaluates the soundness of the building from a first determination result of determining whether the inter-story displacement exceeds a preset inter-story displacement threshold value; and
wherein the building safety evaluation unit determines a final determination result based on the first determination result, and wherein the final determination result includes one of (a) continuous use is possible, (b) continuous use is possible but it should be used with caution, and (c) rapid examination is necessary.

6. A building safety verification system comprising:
a measurement unit which obtains deformation of a building configured by a plurality of stories in which a plurality of acceleration sensors are provided on a plurality of stories of the building, the acceleration sensors measure accelerations of the plurality of stories on a story-by-story basis, an acceleration sensor of a lowest story among the acceleration sensors is provided in a foundation portion or a lowest story portion of the building, and the acceleration sensor detects an acceleration of the foundation portion or the lowest story portion from data of the accelerations of the stories detected by the acceleration sensors during an earthquake and data of the acceleration of the foundation portion or the lowest story portion, and wherein the measurement unit receives the measured accelerations from the plurality of acceleration sensors and calculates an inter-story displacement of individual stories of the plurality of stories provided with the acceleration sensors from the data of the accelerations of the individual stories detected by the acceleration sensors during the earthquake by integrating each of the measured accelerations twice;
an evaluation unit which evaluates soundness of the building after the earthquake occurs using the deformation of the building obtained by the measurement unit; and
wherein the building safety evaluation unit evaluates the soundness of at least one individual story of the plurality of stories from a first determination result of determining whether the inter-story displacement of the at least one individual story exceeds a preset inter-story displacement threshold value; and
wherein the building safety evaluation unit determines a final determination result for the at least one individual story based on the first determination result, and wherein the final determination result includes one of (a) continuous use is possible, (b) continuous use is possible but it should be used with caution, and (c) rapid examination is necessary.

7. The building safety verification system according to claim 6, wherein, when the building safety evaluation unit determines that the inter-story displacement exceeds a preset inter-story displacement threshold value, the final determination result is that rapid examination is necessary.

8. The building safety verification system according to claim 6, wherein the measurement unit calculates an inter-story displacement of a story provided with any acceleration sensor other than the acceleration sensor of the lowest story from the data of the acceleration of the foundation portion or the lowest story portion detected by the acceleration sensor of the lowest story and data of an acceleration of the story detected by any acceleration sensor other than the acceleration sensor of the lowest story.

9. The building safety verification system according to claim 6, wherein the evaluation unit evaluates the soundness of the building after the earthquake occurs in consideration of a change in a tilt of the building due to the earthquake.

10. The building safety verification system according to claim 6, comprising the acceleration sensors,
    wherein the measurement unit is configured to be capable of acquiring data from the acceleration sensors.

11. The building safety verification system according claim 6, wherein the evaluation unit evaluates the soundness of the building through a determination using a combination of any of an inter-story displacement obtained by the measurement unit, a natural period of the building obtained through measurement, and a tilt angle of the building obtained through measurement.

12. The building safety verification system according to claim 11, comprising a natural period measurement unit which obtains the natural period of the building from a micro vibration sensor that measures a micro vibration of a highest story of the building or a story near the highest story.

13. The building safety verification system according to claim 12, wherein the natural period measurement unit obtains the natural period of the building after the earthquake occurs from the micro vibration sensor that measures the micro vibration of the highest story of the building or the story near the highest story.

14. The building safety verification system according to claim 12, wherein the natural period measurement unit obtains the natural period of a microtremor of the building from the micro vibration sensor that measures the micro vibration of the highest story of the building or the story near the highest story, and
    one of the acceleration sensors is provided in the same story as a story in which the micro vibration sensor measures the micro vibration.

15. The building safety verification system according to claim 12, wherein the measurement unit calculates an inter-story displacement of a first story of the building based on a displacement amount of the first story and a displacement amount of the foundation portion of the building.

16. The building safety verification system according to claim 15, wherein the first story of the building is one of the highest story of the building, the story near the highest story, and a story close to the foundation portion.

17. The building safety verification system according to claim 12, wherein the evaluation unit evaluates the soundness of the building through a combination of a first determination result of determining whether the inter-story displacement exceeds a preset inter-story threshold value and a second determination result of determining whether the natural period exceeds a preset natural period threshold value.

18. The building safety verification system according to claim 12, further comprising a tilt angle measurement unit which is disposed in the highest story of the building or near the highest story and measures the tilt angle of the building,
    wherein the evaluation unit evaluates the soundness of the building from the inter-story displacement, the natural period, and the tilt angle.

19. The building safety verification system according to claim 12, wherein the evaluation unit evaluates the soundness of the building through a combination of a first determination result of determining whether the inter-story displacement exceeds a preset inter-story threshold value, a second determination result of determining whether the natural period exceeds a preset natural period threshold value, and a third determination result of determining whether the tilt angle exceeds a preset tilt angle threshold value.

20. The building safety verification system according to claim 6, wherein the acceleration sensors detect accelerations of vibrations due to the earthquake.

21. A building safety verification method comprising the steps of:
    obtaining, by a measurement unit, deformation of a building configured by a plurality of stories in which a plurality of acceleration sensors are provided on a plurality of stories of the building, the plurality of acceleration sensors measure accelerations of the plurality of stories on a story-by-story basis, an acceleration sensor of a lowest story among the plurality of acceleration sensors is provided in a foundation portion or a lowest story portion of the building, and the acceleration sensor detects an acceleration of the foundation portion or the lowest story portion, from data of the accelerations of the stories and data of the acceleration of the foundation portion or the lowest story portion detected by the plurality of acceleration sensors during an earthquake, and wherein the measurement unit receives the measured accelerations from the plurality of acceleration sensors and calculates an inter-story displacement of individual stories of the plurality of stories provided with the plurality of acceleration sensors from the data of the accelerations of the individual stories detected by the plurality of acceleration sensors during the earthquake by integrating each of the measured accelerations twice;
    evaluating soundness of at least one individual story of the plurality of stories in the building after the earthquake occurs using a first determination result of determining whether the inter-story displacement of the at least one individual story exceeds a preset inter-story displacement threshold value; and
    determining a final determination result for the at least one individual story based on the first determination result, and wherein the final determination result includes one of (a) continuous use is possible, (b) continuous use is possible but it should be used with caution, and (c) rapid examination is necessary.

22. A computer-readable recording medium recording a program for causing a computer of a building safety verification system for evaluating soundness of a building configured by a plurality of stories in which a plurality of acceleration sensors are provided on a plurality of stories of the building, the plurality of acceleration sensors measure accelerations of the plurality of stories on a story-by-story basis, and an acceleration sensor of a lowest story among the plurality of acceleration sensors is provided in a foundation portion or a lowest story portion of the building, to execute the steps of:

receiving, by a measurement unit, the measured accelerations from the plurality of acceleration sensors;

obtaining, by the measurement unit, an inter-story displacement of individual stories of the plurality of stories provided with the plurality of acceleration sensors from data of the accelerations of the individual stories detected by the plurality of acceleration sensors during an earthquake by integrating each of the measured accelerations twice;

evaluating the soundness of at least one individual story of the plurality of stories in the building after the earthquake occurs using a first determination result of determining whether the inter-story displacement of the at least one individual story exceeds a preset inter-story displacement threshold value; and determining a final determination result for the at least one individual story based on the first determination result, and wherein the final determination result includes one of (a) continuous use is possible, (b) continuous use is possible but it should be used with caution, and (c) rapid examination is necessary.

* * * * *